(12) United States Patent
Tanaka

(10) Patent No.: US 7,094,168 B2
(45) Date of Patent: Aug. 22, 2006

(54) BELT TENSIONER

(75) Inventor: Katsushi Tanaka, Shizuoka (JP)

(73) Assignee: Showa Corporation, Saitama (JP)

( * ) Notice: Subject to any disclaimer, the term of this patent is extended or adjusted under 35 U.S.C. 154(b) by 189 days.

(21) Appl. No.: 10/449,362

(22) Filed: May 30, 2003

(65) Prior Publication Data

US 2004/0087398 A1 May 6, 2004

(30) Foreign Application Priority Data

Oct. 31, 2002 (JP) .............................. 2002-318933

(51) Int. Cl.
*F16H 7/08* (2006.01)

(52) U.S. Cl. .................................................... 474/109

(58) Field of Classification Search ................ 474/101, 474/109, 110, 113, 115, 117, 118
See application file for complete search history.

(56) References Cited

U.S. PATENT DOCUMENTS 6,193,623 B1 * 2/2001 Koch et al. ................. 474/110

FOREIGN PATENT DOCUMENTS

| JP | 04031632 A | * | 2/1992 |
| JP | 2537547 | | 7/1996 |

* cited by examiner

*Primary Examiner*—Vicky A. Johnson
(74) *Attorney, Agent, or Firm*—Orum & Roth LLC

(57) ABSTRACT

In a belt tensioner, a cylinder is mounted to a side of a stationary member positioned in an upper side. A plunger is mounted to a side of a pulley positioned in a lower side. An outer tube sectioning an oil reservoir forming a gas chamber in an upper portion is provided in an outer periphery of the plunger and the cylinder. A first oil passage communicating the gas chamber with a high pressure oil chamber is provided in an upper portion of the cylinder. A second oil passage communicating the high pressure oil chamber with the oil reservoir is provided in the plunger. An orifice hole is provided in the first oil passage. A first check valve closing at an expansion time is provided in the first oil passage, and a second check valve closing at a compression time is provided in the second oil passage.

38 Claims, 7 Drawing Sheets

BELT TENSIONER

BACKGROUND OF THE INVENTION

1. Field of the Invention

The present invention relates to a belt tensioner applying a tension to a belt or a chain which is provided in a tensioned state between a drive wheel and a driven wheel.

2. Description of the Related Art

In order to apply tension to the belt or the chain (hereinafter, referred to as the belt), when the tension of the belt is suddenly increased and a plunger is to be compressed, the belt tensioner generates a damping force against the compression. When the tension of the belt is suddenly reduced and the plunger is to be expanded, the belt tensioner tends to expedite the expansion.

The belt tensioner is normally used in a so-called erect state in which a side of a cylinder is mounted to a side of a stationary member such as an engine block or the like. The cylinder is positioned at a lower side in a vertical direction and the plunger pivoting an idle pulley is positioned at an upper side. However, in accordance with a layout of a vehicle, there is sometimes a requirement that the belt tensioner is used in a so-called inverted state in which the cylinder is positioned at the upper side and the plunger is positioned at the lower side.

However, in the conventional belt tensioner (specification of Japanese Patent No. 2537547 (patent publication 1)), when it is intended to use the belt tensioner by positioning the cylinder at the upper side, a gas chamber within a casing is positioned at a side of a suction check valve for a high pressure oil chamber within the cylinder. Accordingly, the gas makes an intrusion into the high pressure oil chamber when the plunger is expanded. Thus the belt tensioner cannot be used.

Further, there is a hybrid vehicle structured such that two drive sources comprising an engine and an electric motor are wound by one belt and the drive sources are appropriately switched. In the hybrid vehicle mentioned above, there is a structure in which a belt tensioner adjusting tension of a belt is arranged at a position corresponding to a downstream side of an engine and an upstream side of an electric motor. However, when starting an engine by the electric motor in a state in which the engine is stopped, an automatic tensioner carries out a compressing operation and slip is generated in the belt. Accordingly, in order to hold the belt so as to prevent the belt from slipping, it is necessary to lock a compression stroke of the belt tensioner.

However, in the conventional belt tensioner (the patent publication 1), the damping force in a pressure side is obtained by supplying the working fluid in the high pressure oil chamber to an annular gap between an inner periphery of the cylinder and the plunger. It is impossible to close the annular gap. Therefore, it is hard to provide the lock mechanism of the compression stroke.

The applicant of the present invention has proposed a belt tensioner which can be used in the inverted state, in Japanese Patent Application No. 2002-259393. This belt tensioner is structured such that an inner tube is provided within an outer tube. A piston rod is inserted to a rod guide and an oil seal is provided in an opening portion of the outer tube. A piston rod side oil chamber and a piston side oil chamber, which is a high pressure oil chamber, are sectioned in an inner portion of the inner tube by a piston provided in a tip portion of the piston rod. An oil reservoir is provided between the outer tube and the inner tube. A discharge check valve inhibiting the oil from flowing from the oil reservoir to the high pressure oil chamber is provided in an orifice flow passage of a partition wall member provided in the inner tube, and urging means for urging the discharge check valve in a valve closing direction is provided. The urging means is placed so that the outer tube is positioned at the upper side and the piston rod is positioned at the lower side.

However, according to the belt tensioner proposed by the applicant of the present invention, since it is necessary that the rod guide, along which the piston rod slides, and the oil seal are provided in the opening portion of the outer tube, the number of the constituting parts is increased and cost becomes high. Further, since the piston is provided in the tip portion of the piston rod and a diameter of the inner tube is increased, the outer diameter of the belt tensioner increases.

SUMMARY OF THE INVENTION

An object of the present invention is to provide a belt tensioner which can be used even when a piston rod is positioned at a lower side, in which the number of constituting parts can be reduced and cost can be reduced.

Another object of the present invention is to make an outer diameter of the belt tensioner compact.

The other object of the present invention is to provide a belt tensioner which can lock more compression in a compression direction while allowing expansion in an expansion direction, and can securely absorb slack of a belt.

The present invention relates to a belt tensioner provided between a side of a stationary member and a side of a pulley, and further relates to applying a tension to a belt. A plunger is slidably inserted into a cylinder. The cylinder is mounted to the side of the stationary member positioned in an upper side, and the plunger is mounted to the side of the pulley positioned in a lower side. A high pressure oil chamber sectioned by the cylinder and a pressurizer of the plunger is formed within the cylinder. An outer tube sectioning an oil reservoir forming a gas chamber in an upper portion is provided in an outer periphery of the plunger and the cylinder. A first oil passage communicating the gas chamber with the high pressure oil chamber is provided in an upper portion of the cylinder. A second oil passage communicating the high pressure oil chamber with the oil reservoir is provided in the plunger. An orifice hole is provided in the first oil passage and a first check valve closing during an expansion period is provided in the first oil passage. A second check valve closing during a compression period is provided in the second oil passage.

BRIEF DESCRIPTION OF THE DRAWINGS

The present invention will be more fully understood from the detailed description given below and from the accompanying drawings which should not be taken to be a limitation on the invention, but are for explanation and understanding only. The drawings.

DESCRIPTION OF THE PREFERRED EMBODIMENTS

First Embodiment—FIGS. 1 to 5

A hydraulic belt tensioner 10 is provided, for example, between a stationary member such as an engine block or the like and an idle pulley in a hybrid vehicle, and which applies tension to a belt provided in a tensional manner between a drive wheel and a driven wheel by pressing the idle pulley to the belt.

Figure 1:
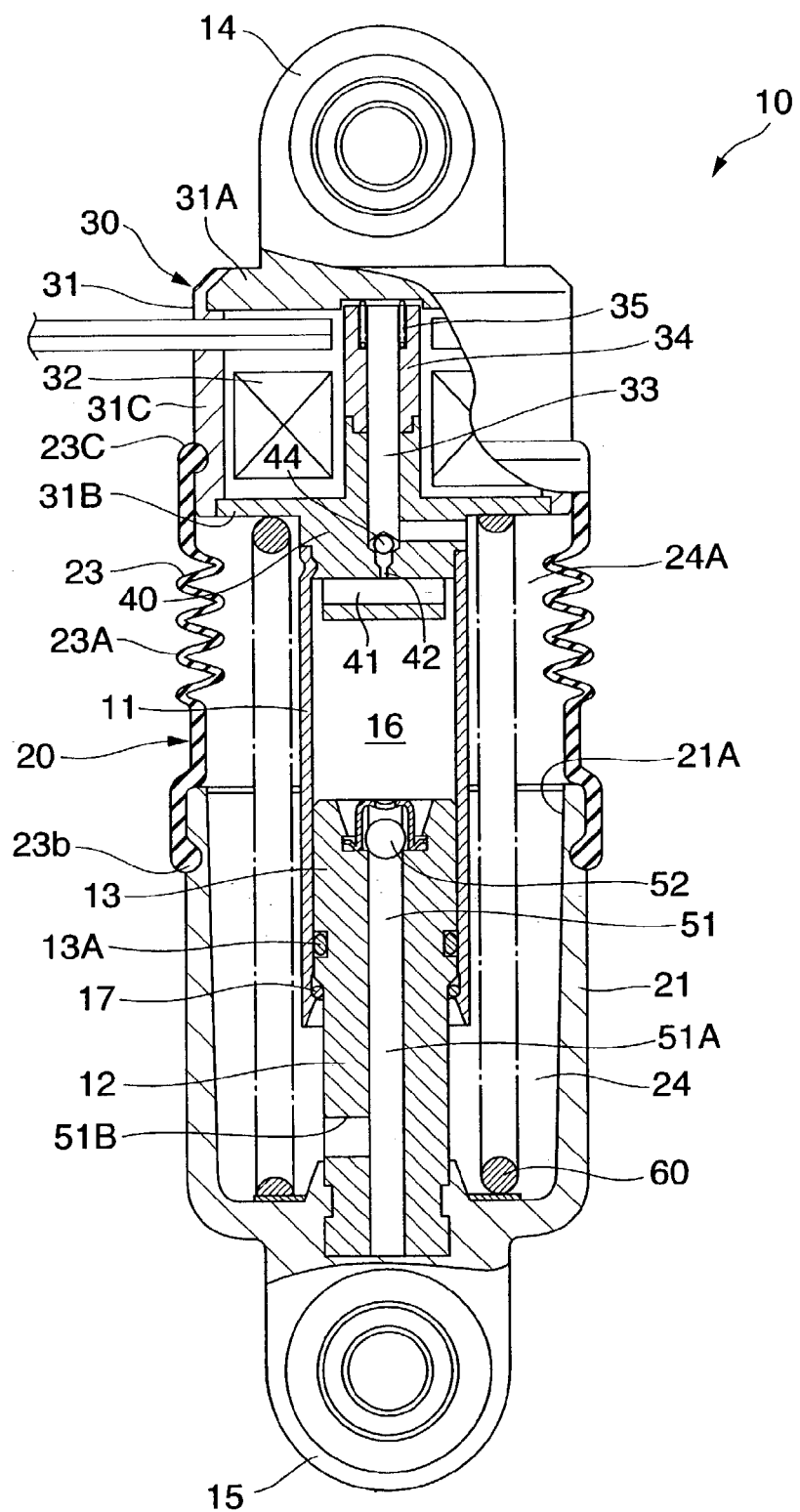
FIG. 1 is a schematic view showing a belt tensioner according to a first embodiment.

The belt tensioner 10 is used by slidably inserting a pressurizer 13 provided with a piston ring 13A of a plunger 12 to an inner portion of a cylinder 11, mounting the cylinder 11 to a side of a stationary member positioned in an upper side in a vertical direction, and mounting an idle pulley to a side of the plunger 12, as shown in FIG. 1. The cylinder 11 is fixed to a housing 31 of an electromagnetic valve 30 mentioned below, and is provided with a mounting member 14 in an upper portion of the electromagnetic valve 30. The plunger 12 is provided with a mounting member 15 in a lower portion.

The belt tensioner 10 forms a high pressure oil chamber 16 sectioned by the cylinder 11 and the pressurizer 13 of the plunger 12, within the cylinder 11. The plunger 12 structures the pressurizer 13 by the plunger 12 itself. A tip portion, which is an upper end portion, of the plunger 12 is formed so as to have a slightly larger diameter than that of a base end portion, which is a lower end portion. This large diameter portion is formed as the pressurizer 13 which is in slidable contact with an inner periphery of the cylinder 11. The plunger 12 is engaged with a stop ring 17 attached to an inner periphery of a lower end opening of the cylinder 11 in an axial direction by a step end face close to a base end portion, which is a small diameter portion, of the pressurizer 13, thereby restricting an expansion end. During compressing of the plunger 12, an outer periphery of a base end portion coming next to the pressurizer 13 of the plunger 12 forms an annular gap between the outer periphery of the base end portion and the inner periphery of the cylinder 11. However, this annular gap constitutes a part of an oil reservoir 24 mentioned below.

In this case, the plunger 12 may be structured such that an entirety of a portion entering into the cylinder 11 at a maximum compressing time is formed as a large diameter portion being in slide contact with the inner periphery of the cylinder 11. The stop ring 17 provided in the inner periphery of the lower end opening in the cylinder 11 is omitted.

The belt tensioner 10 is provided with a casing 21 which is integrally formed with the mounting member 15 which is fixed to a lower portion of the plunger 12 by caulking or the like. The casing 21 is open in an upper end portion thereof. A flexible dust boot 23 is provided between an opening portion 21A of the casing 21 and a housing 31 of the electromagnetic valve 30 in a side of the cylinder 11. The dust boot 23 is provided with a bellows 23A capable of expanding and contracting in an axial direction. A lower engagement convex portion 23B is attached in a liquid tight manner to an annular recess portion in an outer periphery of the casing 21, and an upper engagement convex portion 23C is attached in a liquid tight manner to an annular recess portion in an outer periphery of the housing 31. An outer tube 20 is formed by the casing 21 and the dust boot 23. In the belt tensioner 10, a space sealed between the outer tube 20, and the cylinder 11 and the outer periphery of the plunger 12 is formed as an oil reservoir 24 and an upper portion of the oil reservoir 24 is formed as a gas chamber 24A. The bellows 23A of the dust boot 23 absorbs the expansion and contraction of the plunger 12.

In this case, the outer tube 20 is attached to a side of the plunger 12 and a side of the cylinder 11 respectively by upper and lower base end portions, and is constituted only by the dust boot expanding and contracting in the axial direction. Accordingly, it is not essential to employ the casing 21 together therewith.

The belt tensioner 10 is structured such that an iron housing 31 of the electromagnetic valve 30 is fixed in a liquid tight manner to an upper portion of the cylinder 11 by caulking or the like. The housing 31 of the electromagnetic valve 30 is an assembly constituted by upper and lower housings 31A and 31B and an outer peripheral housing 31C. In the housing 31, the upper housing 31A is set to the mounting member 14, the cylinder 11 is fixed to the lower housing 31B, and the engagement convex portion 23C of the dust boot 23 is engaged with the outer peripheral housing 31C.

Figure 2:
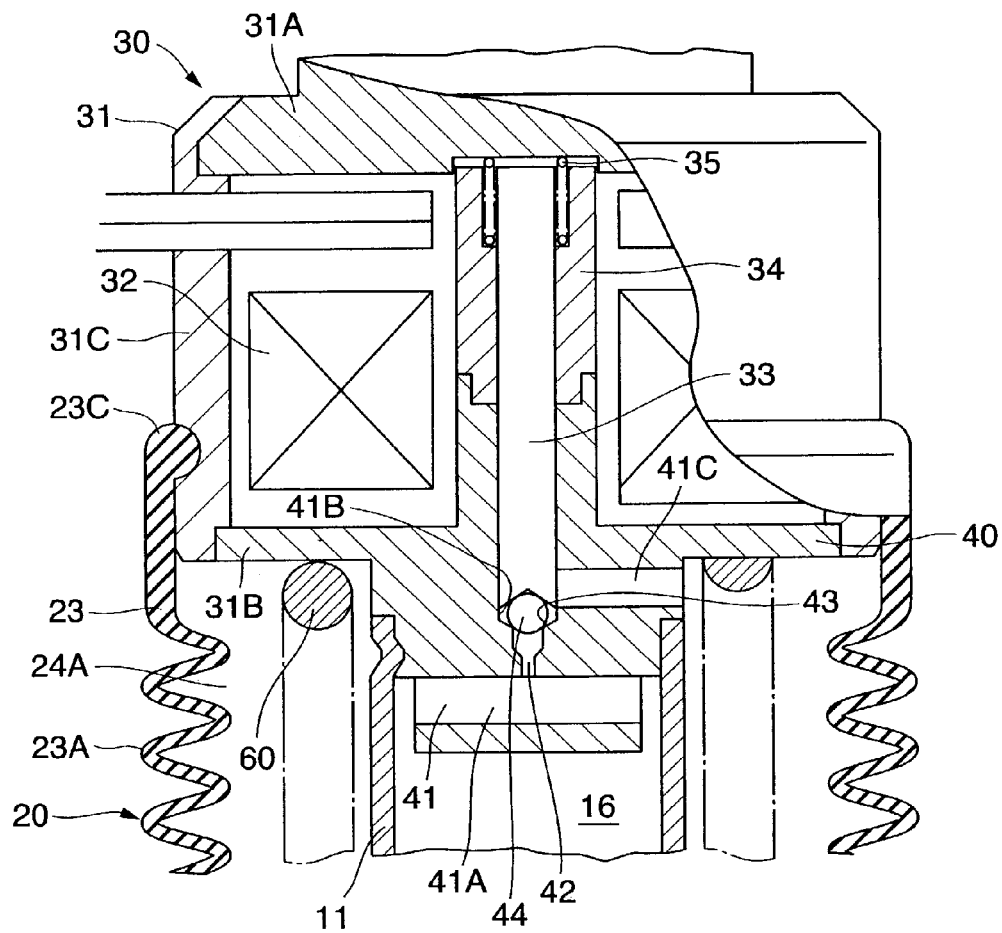
FIG. 2 is an enlarged view of a main portion showing a first check valve in FIG. 1 together with a peripheral portion thereof.

In the belt tensioner 10, the housing 31B of the electromagnetic valve 30 to which the upper portion of the cylinder 11 is fixed is formed as a partition wall member 40 sectioning between the high pressure oil chamber 16 and the gas chamber 24A. The partition wall member 40 forms a first oil passage 41 communicating the high pressure oil chamber 16 with the gas chamber 24A, as shown in FIG. 2. The first oil passage 41 is constituted by a transverse hole 41A, which is penetrated along a diametrical direction of the cylinder 11 in the lower end portion of the partition wall member 40, and is open to the high pressure oil chamber 16, a vertical hole 41B which is pierced on a center axis of the partition wall member 40, and a transverse hole 41C which is pierced along a radial direction of the cylinder 11 in a middle portion of the partition wall member 40 communicates the vertical hole 41B with the gas chamber 24A. The belt tensioner 10 is provided with an orifice hole 42 arranged along the center axis of the partition wall member 40, between the middle portion of the transverse hole 41A and the vertical hole 41B in the first oil passage 41. A tapered seat surface 43 is formed in an upper portion of the orifice hole 42 facing to the vertical hole 41B in the partition wall member 40, and is provided with a first check valve 44 constituted by a ball valve on the seat surface 43. The first check valve 44 is provided between the orifice hole 42 and the gas chamber 24A. It carries out a closing operation when the plunger 12 is expanded, and carries out an opening operation when the plunger 12 is compressed.

The electromagnetic valve 30 is structured such that a solenoid 32 is arranged in an inner portion of the housing 31. A stainless steel pushing element 33 is arranged in a center portion of the solenoid 32. A steel collar 34 is fixed to an upper end portion of the pushing element 33 by a press fit or the like. A lower end portion of the pushing element 33 is inserted to a vertical hole 41B of the housing 31B (the partition wall member 40). The lower end portion of the pushing element 33 can be brought into contact with the first check valve 44.

The belt tensioner 10 is structured such that in the electromagnetic valve 30, the pushing element 33 and the collar 34 backup-support a coil spring (an urging means), 35 loaded into a recess portion between the collar 34 and the pushing element 33 provided in the upper end side of the collar 34 by the housing 31A. An urging force of the spring 35 is applied to the first check valve 44 from the pushing element 33, and the first check valve 44 is seated on the seat surface 43 when the plunger 12 is expanded, whereby the belt tensioner 10 closes the first check valve 44.

In the belt tensioner 10, the electromagnetic valve 30 is structured as lock means which is operated on the basis of an input signal and which closes the first oil passage 41. That is, in the belt tensioner 10, in the case that it is necessary to lock the plunger 12 so that the plunger 12 is not compressed more in the middle of the compression stroke, in order to inhibit the belt from slipping, the input signal for locking is applied and the electromagnetic valve 30 is urged.

The pushing element 33 moving to the lower side closes the first check valve 44 and closes the first oil passage 41.

Figure 3:
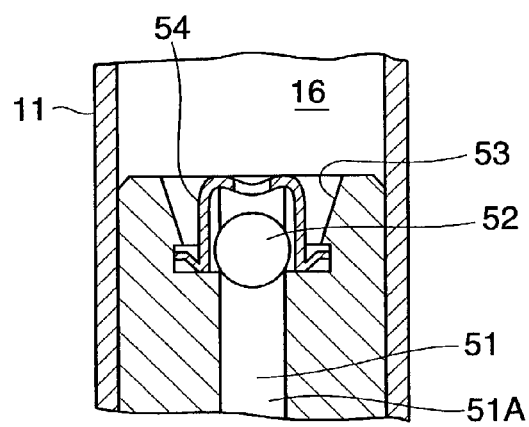
FIG. 3 is an enlarged view of a main portion showing a second check valve in FIG. 1 together with a peripheral portion thereof.

The belt tensioner 10 is provided with a second oil passage 51 communicating the high pressure oil chamber 16 with the oil reservoir 24 in the plunger 12, and is provided with a second check valve 52 closing at the compressing time of the plunger 12 and opening at the expanding time in the second oil passage 51. The second oil passage 51 is constituted by a vertical hole 51A open to the high pressure oil chamber 16 and a transverse hole 51B open to the oil reservoir 24. The second check valve 52, as shown in FIG. 3, constituted by a ball valve, is received in a large diameter recess portion 53 of the vertical hole 51A. It is prevented from dropping out toward an outer side by a cage-shaped valve stopper 54 provided in an opening portion of the large diameter recess portion 53 facing to the high pressure oil chamber 16, and is moved close to or apart from a valve seat of the large diameter recess portion 53 (a middle step portion of the vertical hole 51A) so as to be opened and closed.

The belt tensioner 10 is provided with a coil spring 60 which is interposed between the partition wall member 40 (the housing 31B) in a side of the cylinder 11 and the mounting member 15 in a side of the plunger 12. It urges the cylinder 11 and the plunger 12 in an expanding direction, in an inner portion of the oil reservoir 24 formed between the outer tube 20 and the cylinder 11.

The belt tensioner 10 operates in the following manner.

(1) The belt tensioner 10 presses the idle pulley against the belt on the basis of the urging force of the coil spring 60, and applies a predetermined tension to the belt.

(2) Since the first check valve 44 is closed when the tension of the belt is suddenly reduced, and the plunger 12 is expanded by the coil spring 60, the high pressure oil chamber 16 becomes a negative pressure. However, the second check valve 52 is immediately opened, and the oil in the oil reservoir 24 is quickly supplied to the high pressure oil chamber 16.

(3) When the tension of the belt is suddenly increased and the plunger 12 is compressed by the belt, the second check valve 52 is closed, and the high pressure oil chamber 16 becomes high pressure. When the oil in the high pressure oil chamber 16 reaches a high pressure, it pushes and opens the first oil passage 41 provided in the partition wall member 40 and the first check valve 44 of the orifice hole 42. It flows to the oil reservoir 24 from the first oil passage 41 and the orifice hole 42, thereby generating the pressure side damping force. In this case, at this compression stroke, bubbles stored in the upper portion of the high pressure oil chamber 16 are discharged to the gas chamber 24A in the outer periphery of the cylinder 11 through the first oil passage 41.

In the belt tensioner 10, in the case that it is necessary to lock the compression stroke of the plunger 12 in the middle of the compression in order to inhibit the belt from slipping, the pushing element 33 is operated by urging the solenoid 30 on the basis of the input signal. This stops the valve opening of the first check valve 44 in the item (3) mentioned above. Accordingly, both the second check valve 52 and the first check valve 44 are closed, and the oil in the high pressure oil chamber 16 is closed so as to lock the compression stroke of the plunger 12.

In accordance with the present embodiment, the following effects can be obtained.

(1) In the belt tensioner 10, the first oil passage 41 communicating the high pressure oil chamber 16 with the gas chamber 24A is provided in the upper portion of the cylinder 11. The orifice hole 42 is provided in this first oil passage 41. The first check valve 44 closing during expansion is provided between the orifice hole 42 and the gas chamber 24A. The second oil passage 51 communicating the high pressure oil chamber 16 with the oil reservoir 24 is provided in the plunger 12, and the second check valve 52 closing during compression is provided in the second oil passage 51.

Accordingly, since the damping force during compression can be generated by the orifice hole 42, and the first check valve 44 is closed during expansion, air does not make an intrusion into the high pressure oil chamber 16 from the gas chamber 24A. The high pressure oil chamber 16 can be made a negative pressure region by the expansion of the plunger 12. Accordingly, the second check valve 52 provided in the plunger 12 is opened and the working fluid can be sucked into the high pressure oil chamber 16 from the oil reservoir 24.

Therefore, it is possible to use the inverted type, in which the cylinder 11 is positioned at the upper side and the plunger 12 is positioned at the lower side.

(2) Since the oil reservoir 24 is provided between the outer tube 20 and the base end portion of the plunger 12, and the second oil passage 51 communicating the oil reservoir 24 with the high pressure oil chamber 16 is provided in the plunger 12, it is not necessary that the rod guide and the oil seal sectioning the oil chamber in the piston rod side are provided within the outer tube, as in Japanese Patent Application No. 2002-259393 corresponding to the prior application of the applicant of the present invention. It is thereby possible to reduce the number of parts and the cost.

(3) The plunger 12 itself is formed as the pressurizer 13 of the plunger 12. The plunger 12 itself is made to be in slidable contact with the inner periphery of the cylinder 11. The oil reservoir 24 is provided between the casing 21 provided in the side of the plunger 12 and the plunger 12. Accordingly, it is possible to omit the piston and it is possible to omit the piston rod side oil chamber in the inner portion of the inner tube in Japanese Patent Application No. 2002-259393 mentioned above. It is thereby possible to make the cylinder 11 compact, so that it is also possible to make the outer diameter of the belt tensioner 10 compact.

(4) Since the spring 60 urging the cylinder 11 and the plunger 12 in the expansion direction is provided in the oil reservoir 24 between the cylinder 11 and the casing 21, it is possible to make the outer diameter of the belt tensioner 10 compact, in comparison-with the structure in which the spring 60 is provided in the outer side of the casing 21.

(5) Since the spring 60 is provided within the oil reservoir 24, it is not necessary to coat the spring 60 for rust prevention, and it is possible to reduce the cost.

(6) Since the spring 35 corresponding to the urging means rapidly closes the first check valve 44, it is possible to securely prevent air from intruding into the high pressure oil chamber 16 from the gas chamber 24A during expansion.

(7) It is possible to change the valve opening load of the first check valve 44 for opening the orifice hole 42 during compression, and to change the damping force property at the compression time, by changing the spring constant of the spring 35 corresponding to the urging means, and the set load.

(8) The outer tube 20 is constituted by the casing 21 which is provided in a side of the plunger 12 and is open in the upper end portion, and the flexible dust boot 23 which is provided between the opening portion of the casing 21 and the side of the cylinder 11. Accordingly, since the dust boot 23 can be securely fixed to each of the cylinder 11 and the casing 21, and which boot functions as the seal member for the oil reservoir 24 while absorbing the expansion and contraction of the plunger 12, it is possible to reduce the number of the parts, and the cost.

(9) The first oil passage 41 is provided with lock means (the electromagnetic valve 30) operated on the basis of the input signal and closing the first oil passage 41. Accordingly, it is possible to inhibit the belt tensioner 10 from being compressed more at a time when the input signal is input. For example, in the hybrid vehicle, even when the drive source is switched from the engine to the electric motor, and the belt tensioner 10 is positioned in the upstream side with respect to the pulley of the electric motor in view of the traveling direction of the belt, it is possible to reduce slipping between the pulley of the electric motor and the belt. It is also possible to reduce power loss.

When the belt is further loosened from the position at which the lock is applied to the compression, the second check valve 52 opens. The plunger 12 can extend in the expansion direction, so that the plunger 12 is freely extended in the expansion direction and is locked in the compression direction. In this way, the slack of the belt can be securely absorbed.

(10) Since the first oil passage 41 is provided in the side of the cylinder 11 in the stationary member side, it is possible to easily connect the electric wire or the like for transmitting the input signal to the lock means (the electromagnetic valve 30) provided in the first oil passage 41. It is easy to secure reliability of the operation of the belt tensioner 10.

(11) The first check valve 44 functions as a lock valve closing the first oil passage 41, in addition to the function of preventing the air from making an intrusion into the high pressure oil chamber 16 in the inner portion of the cylinder 11 from the gas chamber 24A during expansion. Accordingly, it is possible to reduce the number of the parts without requiring specific parts such as the lock valve. Further, it is possible to securely lock the compression of the plunger 12.

(12) The partition wall member 40 is provided in the upper portion of the cylinder 11. The orifice hole 42 and the taper-shaped seat surface 43 are formed in the partition wall member 40. It is possible to easily arrange the first check valve 44 comprising the ball valve.

(13) The lock means is formed by the electromagnetic valve 30. Accordingly, the response of the lock means is excellent, and it is possible to lock the compression at an optional position of the compression stroke of the plunger 12.

(14) The first oil passage 41 is provided in the housing 31 of the electromagnetic valve 30, and the first check valve 44 is provided in the first oil passage 41. Accordingly, it is possible to reduce the number of parts and it is possible to improve the ease of assembly.

Figure 4:
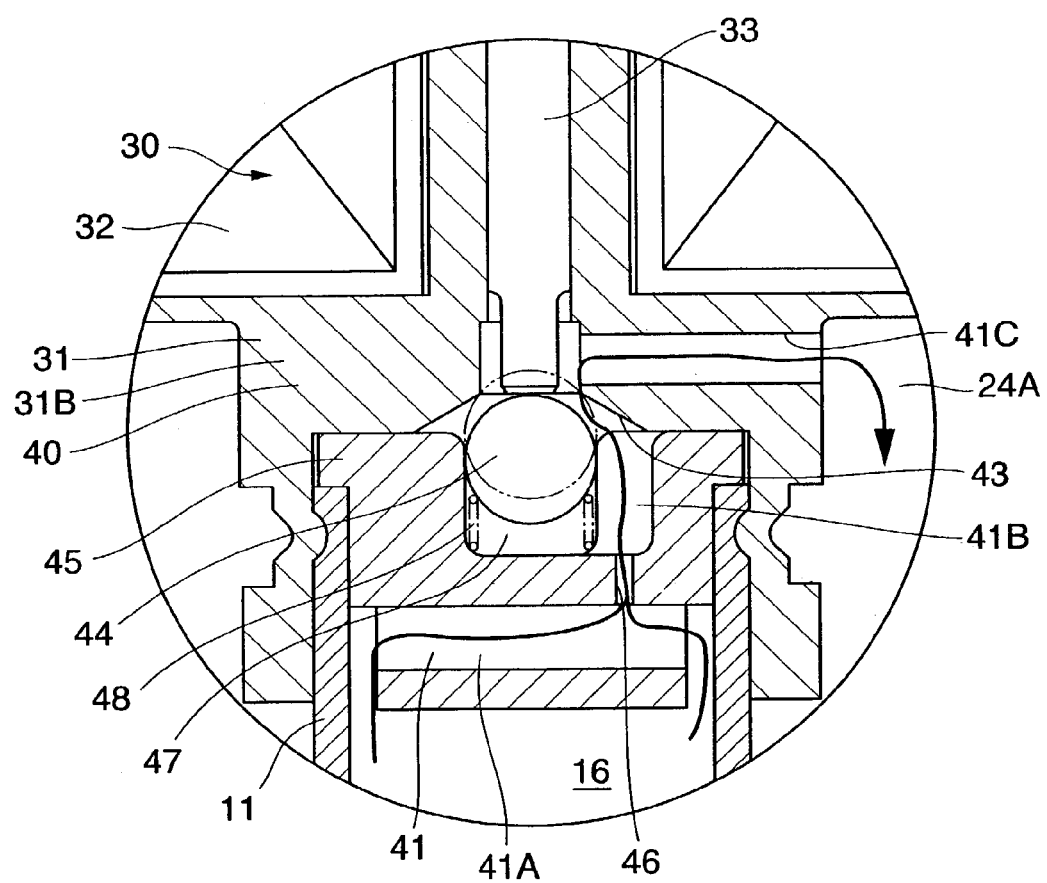
FIG. 4 is a schematic view showing a modified embodiment of the first check valve.
Figure 5A:
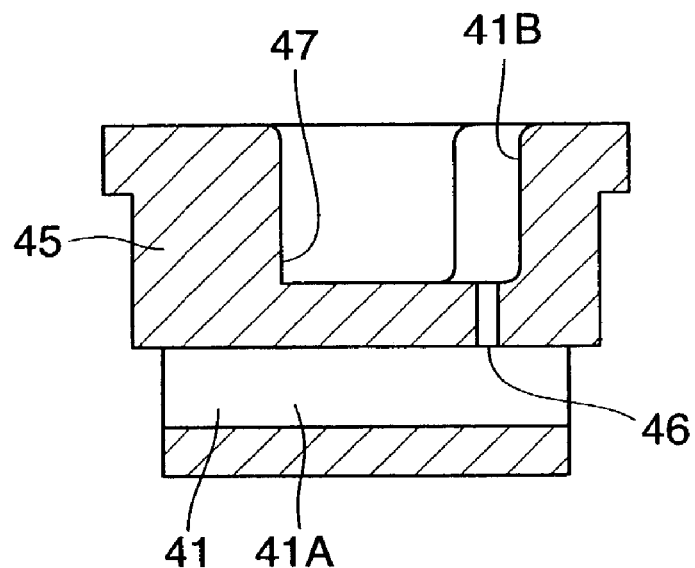
FIG. 5 is a schematic view showing an orifice member.
Figure 5B:
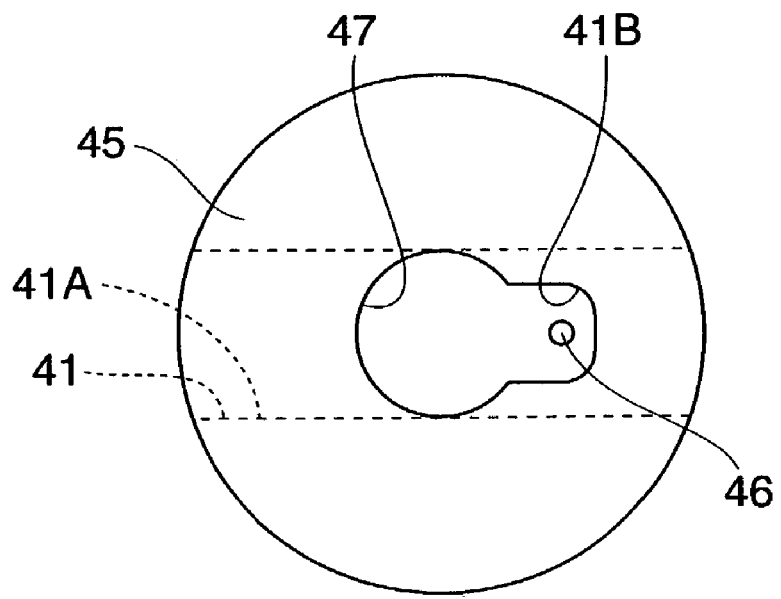

FIG. 4 is a modified embodiment of the belt tensioner 10, in which an orifice member 45 is interposed in a replaceable manner in the fixed portion between the cylinder 11 and the partition wall member 40 (the housing 31B of the electromagnetic valve 30). The partition wall member 40 and the orifice member 45 form the first oil passage 41 in conjunction with each other. First oil passage 41 is constituted by the transverse hole 41A which is open to the high pressure oil chamber 16 provided in the orifice member 45, the vertical hole 41B which is provided so as to be astride the orifice member 45 and the partition wall member 40, and the transverse hole 41C which is provided in the partition wall member 40 and which communicates the vertical hole 41B with the gas chamber 24A. The orifice member 45 is provided, as shown in FIG. 5, with an orifice hole 46 connecting the transverse hole 41A and the vertical hole 41B. It forms a spring chamber 47 in a part of the vertical hole 41B, and receives a coil spring 48 in place of the spring 35. When the plunger 12 is expanded, the ball valve constituting the first check valve 44 seats on the seat surface 43 provided in the lower surface of the partition wall member 40 and the middle portion of the vertical hole 41B due to the urging force of the spring 48, thereby carrying out the closing operation of the first check valve 44.

Figure 6:
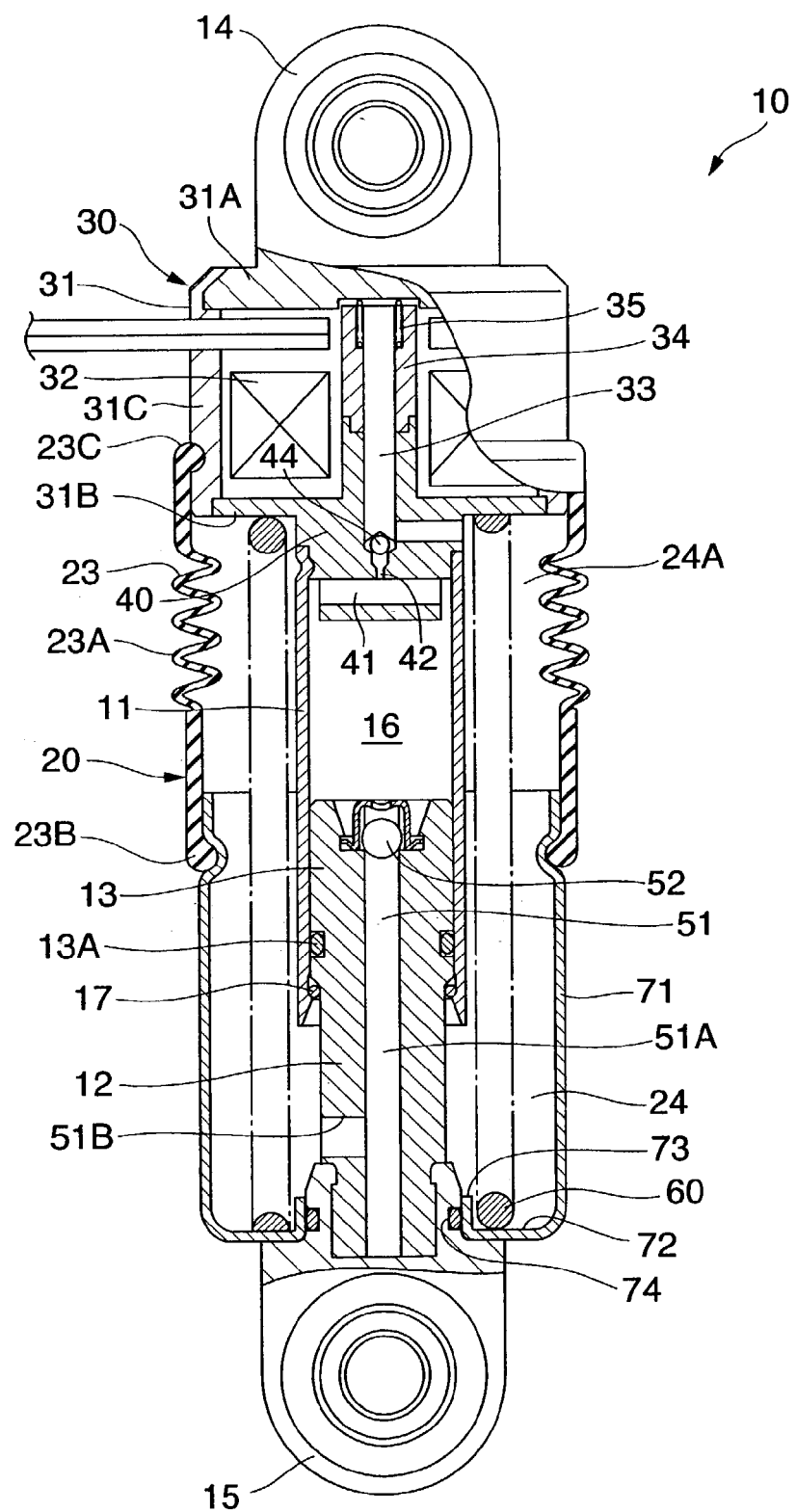
FIG. 6 is a schematic view showing a belt tensioner according to a second embodiment.

Second Embodiment—FIG. 6

The belt tensioner 10 according to the second embodiment is different from the belt tensioner 10 according to the first embodiment in that the casing 21 constituting the outer tube 20 in the first embodiment is replaced by a casing 71 consisting of a press work piece independently provided from the mounting member 15 fixed to the lower portion of the plunger 12. The casing 71 is structured by seating a lower flange portion 72 to the mounting member 15, clamping the flange portion 72 by the spring 60, and fitting an upstanding portion 73 in an inner periphery of the flange portion 72 to an O-ring 74 provided in the mounting member 15 in a liquid tight manner.

The dust boot 23 provided with the bellows 23A is provided in the side of the cylinder 11. The dust boot 23 is attached in a liquid tight manner to the casing 71, in the same manner as that of the first embodiment.

Figure 7:
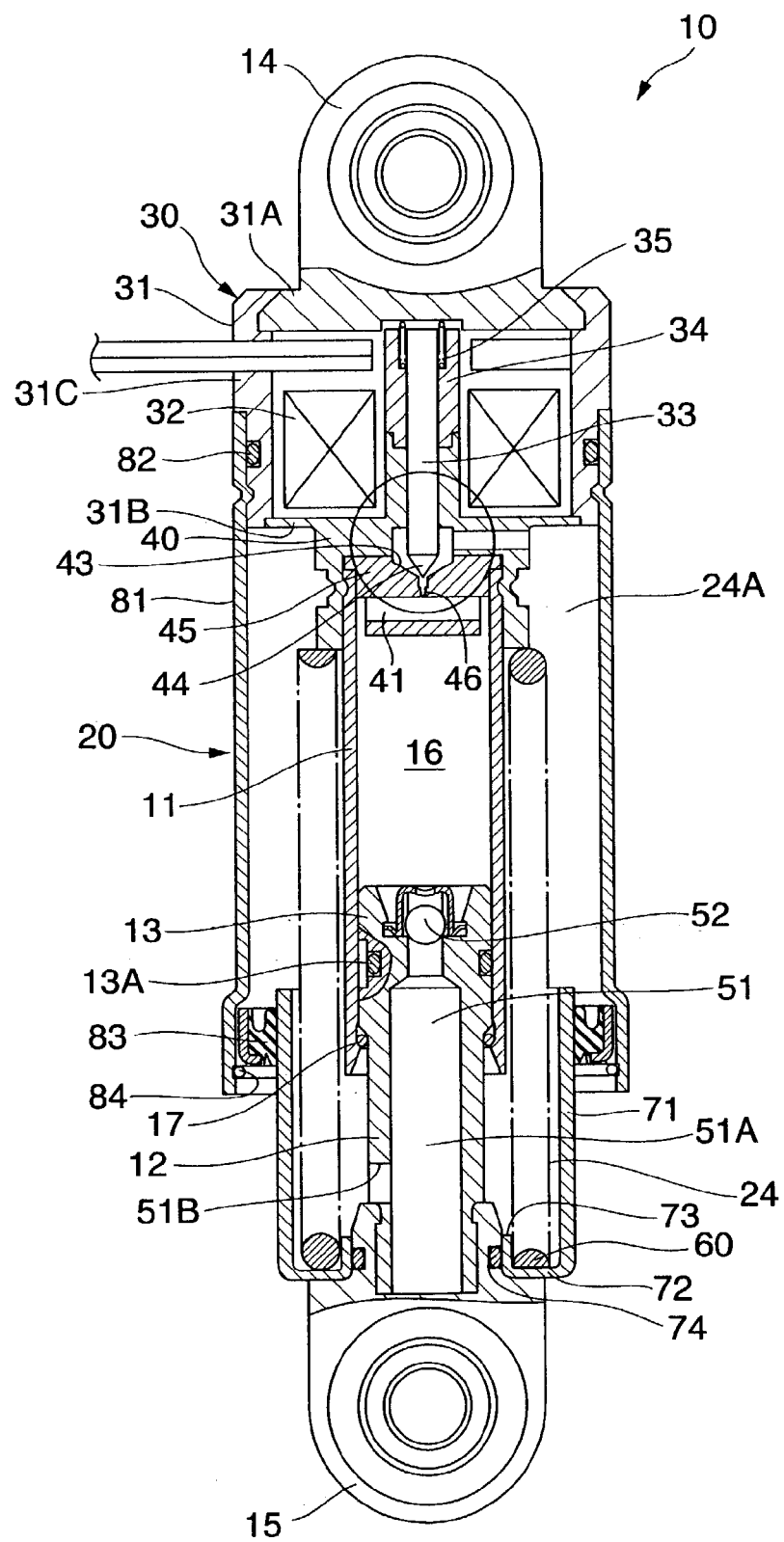
FIG. 7 is a schematic view showing a belt tensioner according to a third embodiment.
Figure 8:
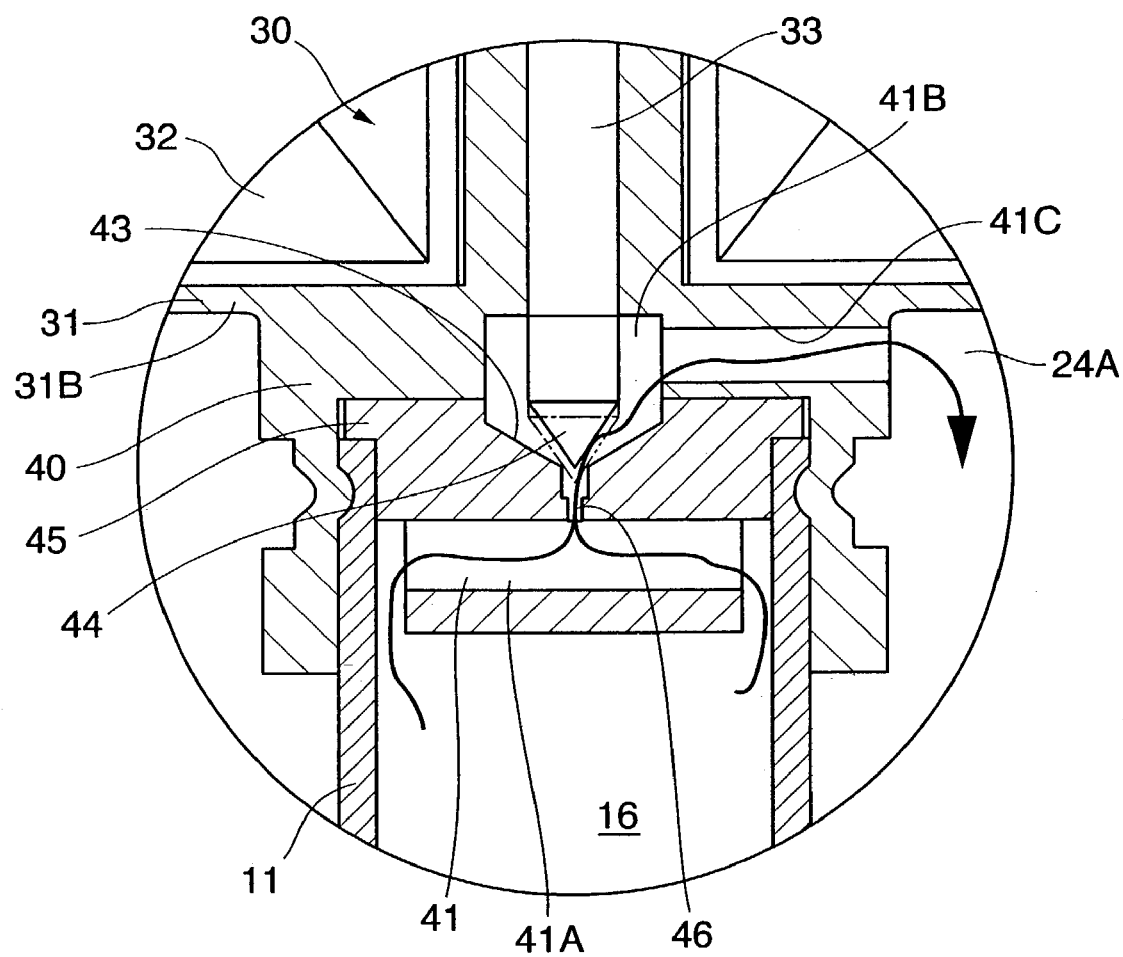
FIG. 8 is an enlarged view of a main portion showing a first check valve in FIG. 7 together with a peripheral portion thereof.

Third Embodiment—FIGS. 7 and 8

The belt tensioner 10 according to the third embodiment is different from the belt tensioner 10 according to the second embodiment in that the dust boot 23 constituting the outer tube 20 in the second embodiment is replaced by a cover 81 consisting of a press work piece. The cover 81 is fixed in a liquid tight manner to an O-ring 82 provided in the outer periphery of the housing 31 of the electromagnetic valve 30 in the side of the cylinder 11, and is fixed to the housing 31 by caulking or the like. An oil seal 83 is fitted in a liquid tight manner to an expanded inner peripheral portion provided in a lower end opening of the cover 81, and is fixed by a stop ring 84. An upper end outer peripheral surface of the casing 71 is inserted in a liquid tight manner to the oil seal 83 of the cover 81. The casing 71 is in slidable contact with the oil seal 83 of the cover 81, thereby absorbing the expansion and contraction of the plunger 12.

Further, in the belt tensioner 10 according to the third embodiment, as shown in FIG. 8, the orifice member 45 is interposed in a replaceable manner in the fixed portion between the cylinder 11 and the partition wall member 40 (the housing 31B of the electromagnetic valve 30). The partition wall member 40 and the orifice member 45 form the first oil passage 41 in conjunction with each other. First oil passage 41 is constituted by the transverse hole 41A which is open to the high pressure oil chamber 16 provided in the orifice member 45, the vertical hole 41B which is provided so as to be astride the orifice member 45 and the partition wall member 40, and the transverse hole 41C which is provided in the partition wall member 40 which communicates the vertical hole 41B with the gas chamber 24A. The orifice member 45 has the orifice hole 46 connecting the transverse hole 41A and the vertical hole 41B, and forms the taper-shaped seat surface 43 in the upper portion of the orifice 46 facing to the vertical hole 41B in the orifice member 45. Further, the ball valve is not used as the first check valve 44. The tip portion of the pushing element 33 of the electromagnetic valve 30 is worked as a needle valve, and the needle valve is set as the first check valve 44. Due to the urging force of the spring 35 provided in the upper end side of the pushing element 33 and the collar 34 in the electromagnetic valve 30, the first check valve 44 of the pushing element 33 is moved close to or apart from the seat surface 43 provided in the orifice member 45. The first check valve 44 is thereby opened and closed.

According to the present embodiment, the pushing element 33 of the electromagnetic valve 30 is set as the first check valve 44. Therefore, no specific check valve is required in addition to the pushing element 33 of the electromagnetic valve 30, and it is possible to reduce the number of the parts.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

According to the present invention, it is possible to obtain a belt tensioner which can be used even by positioning the plunger in the lower side, and can reduce the number of the parts and the cost.

Further, according to the present invention, it is possible to make the outer diameter of the belt tensioner relatively small.

Further, according to the present invention, it is possible to obtain a belt tensioner which can lock more compression in the compression direction while making it possible to extend in the expansion direction, thereby securely absorbing the slack of the belt.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A belt tensioner positionable between a side of a stationary member and a side of a pulley, arranged and constructed to provide tension to a belt, comprising:

a plunger slidably inserted into a cylinder;
the cylinder being mountable to the side of the stationary member positioned in an upper side, and the plunger being mountable to the side of the pulley positioned in a lower side;
a high pressure oil chamber sectioned by the cylinder and a pressurizer of the plunger being formed within the cylinder;
an outer tube sectioning an oil reservoir forming a gas chamber in an upper portion being disposed in an outer periphery of the plunger and the cylinder;
a first oil passage communicating the gas chamber with the high pressure oil chamber being disposed in an upper portion of the cylinder;
a second oil passage communicating the high pressure oil chamber with the oil reservoir being disposed in the plunger;
an orifice hole being provided in the first oil passage and a first check valve closing during expansion being disposed in the first oil passage; and
a second check valve closing during compression being disposed in the second oil passage,
wherein the outer tube comprises a dust boot attachable respectively to the side of the plunger and the side of the cylinder in upper and lower base end portions, and being expandable and contractable in an axial direction.

2. The belt tensioner according to claim 1, wherein the pressurizer of the plunger comprises the plunger.

3. The belt tensioner according to claim 2, wherein a spring urging the cylinder and the plunger in an expansion direction is disposed in an inner portion of the oil reservoir between the cylinder and the outer tube.

4. The belt tensioner according to claim 2, further comprising urging means for urging the first check valve in a valve closing direction is provided.

5. The belt tensioner according to claim 2, wherein the outer tube comprises a casing disposed in the side of the plunger and opening an upper end portion, and said flexible dust boot disposed between an opening portion of the casing and the side of the cylinder.

6. The belt tensioner according to claim 2, wherein lock means operated by an input signal and closing the first oil passage is disposed in the first oil passage.

7. The belt tensioner according to claim 2, further comprising a partition wall member sectioning the high pressure oil chamber and the gas chamber disposed in an upper portion of the cylinder, the first oil passage being formed in the partition wall member, the orifice hole being disposed in the first oil passage, a seat surface being formed in an upper portion of the orifice hole, and a first check valve comprising the ball valve being provided in the seat surface.

8. The belt tensioner according to claim 1, wherein a spring urging the cylinder and the plunger in an expansion direction is disposed in an inner portion of the oil reservoir between the cylinder and the outer tube.

9. The belt tensioner according to claim 1, further comprising urging means for urging the first check valve in a valve closing direction is provided.

10. The belt tensioner according to claim 9, wherein a mounting member is fixable to a lower portion of the plunger, and the casing comprising the outer tube is independently formed from the mounting member.

11. The belt tensioner according to claim 10, wherein the dust boot comprising the outer tube is a cover formed by a press work piece, an oil seal is fitted in a liquid tight manner to an expanded opening portion disposed in a lower end opening of the cover, an upper end outer peripheral surface of the casing is insertable in a liquid tight manner to the oil seal of the cover, and the casing is in slidable contact with the oil seal of the cover.

12. The belt tensioner according to claim 1, wherein the outer tube comprises a casing disposed in the side of the plunger and opening an upper end portion, and said flexible dust boot disposed between an opening portion of the casing and the side of the cylinder.

13. The belt tensioner according to claim 1, wherein lock means operated by an input signal and closing the first oil passage is disposed in the first oil passage.

14. The belt tensioner according to claim 13, wherein the first check valve comprises a ball valve, and the lock means is arranged and constructed to be operated by the input signal and to close the first oil passage via the first check valve.

15. The belt tensioner according to claim 14, wherein the lock means comprises an electromagnetic valve, and the first check valve is arranged and constructed to be closable by a plunger of the electromagnetic valve.

16. The belt tensioner according to claim 15, wherein the first oil passage is formed in a housing of the electromagnetic valve, and the first check valve is disposed in the first oil passage.

17. The belt tensioner according to claim 15, wherein the plunger of the electromagnetic valve is arranged and constructed to function as the first check valve.

18. The belt tensioner according to claim 1, further comprising a partition wall member sectioning the high pressure oil chamber and the gas chamber disposed in an upper portion of the cylinder, the first oil passage being formed in the partition wall member, the orifice hole being disposed in the first oil passage, a seat surface being formed in an upper portion of the orifice hole, and said first check valve comprising the ball valve being provided in the seat surface.

19. The belt tensioner according to claim 1, wherein the second oil passage comprises a vertical hole open to the high pressure oil chamber and a transverse hole open to the oil reservoir, a recess portion formed in a side of a high pressure oil chamber in the vertical hole, the second check valve being receivable in a recess portion of the vertical hole, being arranged and constructed to be prevented from dropping out to an outer side by a cage-shaped stopper disposed in an opening portion facing the high pressure oil chamber of the recess portion, and comprising a ball valve which is movable close to or apart from a valve seat of the recess portion formed in a step portion between the recess portion and the vertical hole so as to be openable and closable.

20. A belt tensioner positionable between a side of a stationary member and a side of a pulley, arranged and constructed to provide tension to a belt, comprising:

a plunger slidably inserted into a cylinder;

the cylinder being mountable to the side of the stationary member positioned in an upper side, and the plunger being mountable to the side of the pulley positioned in a lower side;

a high pressure oil chamber sectioned by the cylinder and a pressurizer of the plunger being formed within the cylinder;

an outer tube sectioning an oil reservoir forming a gas chamber in an upper portion being disposed in an outer periphery of the plunger and the cylinder;

a first oil passage communicating the gas chamber with the high pressure oil chamber being disposed in an upper portion of the cylinder;

a second oil passage communicating the high pressure oil chamber with the oil reservoir being disposed in the plunger;

an orifice hole being provided in the first oil passage and a first check valve closing during expansion being disposed in the first oil passage; and a second check valve closing during compression being disposed in the second oil passage, wherein the second oil passage comprises a vertical hole open to the high pressure oil chamber and a transverse hole open to the oil reservoir, a recess portion formed in a side of a high pressure oil chamber in the vertical hole, the second check valve being receivable in a recess portion of the vertical hole, being arranged and constructed to be prevented from dropping out to an outer side by a cage-shaped stopper disposed in an opening portion facing the high pressure oil chamber of the recess portion, and comprising a ball valve which is movable close to or apart from a valve seat of the recess portion formed in a step portion between the recess portion and the vertical hole so as to be openable and closable.

21. The belt tensioner according to claim 20, wherein the pressurizer of the plunger comprises the plunger.

22. The belt tensioner according to claim 21, wherein a spring urging the cylinder and the plunger in an expansion direction is disposed in an inner portion of the oil reservoir between the cylinder and the outer tube.

23. The belt tensioner according to claim 21, further comprising urging means for urging the first check valve in a valve closing direction is provided.

24. The belt tensioner according to claim 21, wherein the outer tube comprises a casing disposed in the side of the plunger and opening an upper end portion, and a flexible dust boot disposed between an opening portion of the casing and the side of the cylinder.

25. The belt tensioner according to claim 21, wherein lock means operated by an input signal and closing the first oil passage is disposed in the first oil passage.

26. The belt tensioner according to claim 21, further comprising a partition wall member sectioning the high pressure oil chamber and the gas chamber disposed in an upper portion of the cylinder, the first oil passage being formed in the partition wall member, the orifice hole being disposed in the first oil passage, a seat surface being formed in an upper portion of the orifice hole, and a first check valve comprising the ball valve being provided in the seat surface.

27. The belt tensioner according to claim 20, wherein a spring urging the cylinder and the plunger in an expansion direction is disposed in an inner portion of the oil reservoir between the cylinder and the outer tube.

28. The belt tensioner according to claim 20, further comprising urging means for urging the first check valve in a valve closing direction is provided.

29. The belt tensioner according to claim 20, wherein the outer tube comprises a casing disposed in the side of the plunger and opening an upper end portion, and a flexible dust boot disposed between an opening portion of the casing and the side of the cylinder.

30. The belt tensioner according to claim 20, wherein lock means operated by an input signal and closing the first oil passage is disposed in the first oil passage.

31. The belt tensioner according to claim 30, wherein the first check valve comprises a ball valve, and the lock means is arranged and constructed to be operated by the input signal and to close the first oil passage via the first check valve.

32. The belt tensioner according to claim 31, wherein the lock means comprises an electromagnetic valve, and the first check valve is arranged and constructed to be closable by a plunger of the electromagnetic valve.

33. The belt tensioner according to claim 32, wherein the first oil passage is formed in a housing of the electromagnetic valve, and the first check valve is disposed in the first oil passage.

34. The belt tensioner according to claim 32, wherein the plunger of the electromagnetic valve is arranged and constructed to function as the first check valve.

35. The belt tensioner according to claim 20, further comprising a partition wall member sectioning the high pressure oil chamber and the gas chamber disposed in an upper portion of the cylinder, the first oil passage being formed in the partition wall member, the orifice hole being disposed in the first oil passage, a seat surface being formed in an upper portion of the orifice hole, and a first check valve comprising the ball valve being provided in the seat surface.

36. The belt tensioner according to claim 20, wherein a mounting member is fixable to a lower portion of the plunger, and the casing comprising the outer tube is independently formed from the mounting member.

37. The belt tensioner according to claim 36, wherein a dust boot comprising the outer tube is a cover formed by a press work piece, an oil seal is fitted in a liquid tight manner to an expanded opening portion disposed in a lower end opening of the cover, an upper end outer peripheral surface of the casing is insertable in a liquid tight manner to the oil seal of the cover, and the casing is in slidable contact with the oil seal of the cover.

38. A belt tensioner positionable between a side of a stationary member and a side of a pulley, arranged and constructed to provide tension to a belt, comprising:

a plunger slidably inserted into a cylinder;

the cylinder being mountable to the side of the stationary member positioned in an upper side, and the plunger being mountable to the side of the pulley positioned in a lower side;

a high pressure oil chamber sectioned by the cylinder and a pressurizer of the plunger being formed within the cylinder;

an outer tube sectioning an oil reservoir forming a gas chamber in an upper portion being disposed in an outer periphery of the plunger and the cylinder;

a first oil passage communicating the gas chamber with the high pressure oil chamber being disposed in an upper portion of the cylinder;

a second oil passage communicating the high pressure oil chamber with the oil reservoir being disposed in the plunger;

an orifice hole being provided in the first oil passage and a first check valve closing during expansion being disposed in the first oil passage; and a second check valve closing during compression being disposed in the second oil passage, wherein a mounting member is fixable to a lower portion of the plunger, and the casing comprising the outer tube is independently formed from the mounting member and a dust boot comprising the outer tube is a cover formed by a press work piece, an oil seal is fitted in a liquid tight manner to an expanded opening portion disposed in a lower end opening of the cover, an upper end outer peripheral surface of the casing is insertable in a liquid tight manner to the oil seal of the cover, and the casing is in slidable contact with the oil seal of the cover.

* * * * *